United States Patent [19]

Van Ostrand et al.

[11] Patent Number: 4,593,357

[45] Date of Patent: Jun. 3, 1986

[54] MOTOR VEHICLE PERFORMANCE MONITORING SYSTEM

[75] Inventors: William F. Van Ostrand; Jeffrey M. Sylvia, both of Hagerstown, Ind.

[73] Assignee: Laboratory Equipment Corp., Mooresville, Ind.

[21] Appl. No.: 350,168

[22] Filed: Feb. 19, 1982

[51] Int. Cl.⁴ .................... G06F 11/32; G06F 15/20
[52] U.S. Cl. ................................. 364/424; 364/551; 340/52 F
[58] Field of Search .............. 364/424, 550, 551, 709, 364/200, 900, 510, 571, 580; 340/52 R, 517, 52 F, 684, 521

[56] References Cited

U.S. PATENT DOCUMENTS

| | | | |
|---|---|---|---|
| 3,976,975 | 8/1976 | Cochran | 364/709 |
| 4,152,769 | 5/1979 | Olander, Jr. et al. | 364/709 |
| 4,253,156 | 2/1981 | Lisle et al. | 364/510 |
| 4,296,409 | 10/1981 | Whitaker et al. | 340/684 |
| 4,326,411 | 4/1982 | Gant et al. | 364/510 |
| 4,382,280 | 5/1983 | Mandel et al. | 364/709 |
| 4,390,956 | 6/1983 | Cornforth et al. | 364/510 |
| 4,404,638 | 9/1983 | Yada et al. | 364/510 |

FOREIGN PATENT DOCUMENTS 55-76462  9/1980  Japan ..................................... 364/709

OTHER PUBLICATIONS

"Vehicle Performance Testing with Microprocessor Based Instrumentation" by Johnson et al, Published in 1981 by Society of Automotive Engineers, Inc.
P. MacFarlane, "Car Computer Part 1", Practical Electronics, vol. 17, No. 12, Dec. 1981, pp. 30-35.
P. MacFarlane "Car Computer Part 2", Practical Electronics, vol. 18, No. 1, Jan. 1982, pp. 58-61.

Primary Examiner—Gary Chin
Attorney, Agent, or Firm—Woodard, Weikart, Emhardt & Naughton

[57] ABSTRACT

A portable computer based motor vehicle performance monitoring system which performs vehicle characteristic measurements and calculations. The system uses a distance sensor means, a fuel volume flow sensor means, and a fuel temperature sensor means for sensing various vehicle performance characteristics. The system has a computer controlled start/stop feature. It also has a user-prompting programming feature. It also has a combined liquid fuel volume and mass meter which uses a mathematical algorithm which converts volume data to mass data using a temperature sensitive function.

54 Claims, 4 Drawing Figures

MOTOR VEHICLE PERFORMANCE MONITORING SYSTEM

BACKGROUND OF THE INVENTION

1. Field of Invention

This invention relates in general to a system for monitoring and measuring motor vehicle performance characteristics and, more particularly, said system being adapted for measuring motor vehicle displacement data and fuel flow data and calculating various performance characteristics from said data.

2. Description of the Prior Art

In motor vehicle performance testing, it is necessary to measure and calculate various motor vehicle performance characteristics. The types of characteristics measured and calculated are things such as the distance the vehicle traveled, vehicle speed, acceleration measurements, fuel volume consumed, fuel mass consumed, fuel volume flow rate, fuel mass flow rate, and efficiency ratios such as miles per gallon. In the prior art, these measurements and calculations were made by using separate instruments assembled together into an array of instruments on a relay rack. This resulted in complexity of operation, complexity in synchronization between the various instruments, and complexity in the connection between the various instruments. Therefore there was a great deal of time lost putting the array together properly and sometimes there was also lost data. It would therefore be an advantage if this system were incorporated into one unit that performed the desired functions of timing, data measurement, and computation of vehicle performance characteristics. Further the prior art of using an array of separate instruments to perform motor vehicle performance monitoring had the problem that these arrays tended to be bulky and difficult to use. Further, the necessity for many different types of instruments made the vehicle performance monitoring systems expensive.

The prior art also does not show a motor vehicle performance monitoring system which has an easy set-up procedure and which includes a system which starts the monitoring at a preset point and stops the monitoring at a preset point while calculating all the characteristics. The Whitaker U.S. Pat. No. 4,296,409 does disclose a combine performance monitor for monitoring a combine's farming operations. The Whitaker patent shows the use of combine sensors with a microprocessor to monitor farming functions of a combine. However the system does not include a computer controlled starting calculation feature. Only manual starting is available and the stopping calculation is not computer controlled, but once again, requires manual intervention. The device's user control panel does not provide for user-prompting programming in that the user would have to know when to program several features and also how to program them. There is no way to know if the user has programmed all the features he wishes to program without him keeping a mental note external of the system. The present invention features many of the advantages of the Whitaker patent in the area of motor vehicles and also features computer calculated start and stop conditions and includes a very easy to use, user-prompting control panel for programming.

Another example of a prior art monitor is the Meyer patent, U.S. Pat. No. 4,274,144, but the Meyer patent does not have computer controlled start and stop. It also does not have a user-prompting control system nor is it versatile in calculating many vehicle performance characteristics. The Malin U.S. Pat. No. 4,179,740 shows a vehicle performance analyzer which lacks programmability so that it could be used for various vehicle performance tests and therefore is limited to a small number of features. Malin also lacks calculated computer start/stop and user-prompting programmability. Watson, U.S. Pat. No. 3,549,868 shows a fuel-mileage computer. Watson is an example of a limited performance characteristic monitor of the type which would need an array of other monitors in conjunction with it to peform many tests on the vehicle. Further Watson does not have a computer calculated start/stop feature and does not have a user-prompting programmability feature.

One of the vehicle performance characteristics that is important in today's striving for more economic motor vehicles is the volume and mass of the fuel used by the motor vehicle. In the prior art the measurement of fuel mass and volume required the use of expensive mass and volume meters which had various delicate and difficult to use components. Therefore, the measurement of fuel mass and volume tended to be a very difficult and/or expensive endeavor. The Duffy U.S. Pat. No. 3,314,524 shows a mass flow measuring device which converts volume flow to mass flow electronically. However, the system does not calculate both volume and mass flow values nor does it output volume flow and is therefore not a combined mass and volume flow meter. The Kissel U.S. Pat. No. 4,018,964 is a device for controlling the fuel-air ratio for internal combustion. It incorporates mass measurement but does not have an output or versatile programming control for vehicle performance testing because it is a unit built into the motor vehicle.

Unlike the prior art, the present invention provides for a vehicle performance monitoring system which incorporates into a single unit the desired functions of timing, data measurement, and computation of vehicle performance characteristics. Further, the present invention provides for a combined fuel mass and volume meter which is easy to use and inexpensive. The present invention also has computer calculated start/stop and a user-prompting programming system that is easy to use.

SUMMARY OF THE INVENTION

This invention relates to improved motor vehicle performance monitoring and a feature of the present invention comprises a motor vehicle performance monitoring system which measures motor vehicle performance characteristics. The system comprises motor vehicle performance sensor means for sensing motor vehicle performance characteristics and producing data signals corresponding to the motor vehicle performance characteristic sensed. The system further comprises computer means which have computer parameters which include a starting parameter and a stopping parameter. These computer means are engaged with the motor vehicle performance sensor means so as to receive as input the data signals of the motor vehicle sensor means and to calculate motor vehicle performance characteristics from said data signals. The system further includes data output means for data output of the computer means calculations of motor vehicle performance characteristics. The system also includes programming control means for selection and setting of computer parameters and for selection and setting of output data. And finally the system includes a data output control means for controlling the data output means so as to select output data.

It is therefore an object of this invention to provide a vehicle performance monitoring system for the measurement of motor vehicle performance characteristics.

It is further an object of this invention to provide for a system which includes a variety of computer controlled start/stop conditions.

It is further an object of this invention to provide a motor vehicle performance monitoring system that incorporates the desired functions of timing, data measurement and computation of vehicle performance characteristics into a single instrument.

It is a further object of this invention to provide a motor vehicle performance monitoring system that is easy to use and is readily set up and programmed by a user because the invention includes a user-prompting programming system.

It is a further object of this invention to provide a motor vehicle performance monitoring system that is small and portable and inexpensive.

It is a further object of this invention to provide for a motor vehicle performance monitoring system which has an improved fuel flow meter which calculates both volume flow characteristics and mass flow characteristics.

Related objects and advantages will become apparent as the description proceeds.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Figure 1:
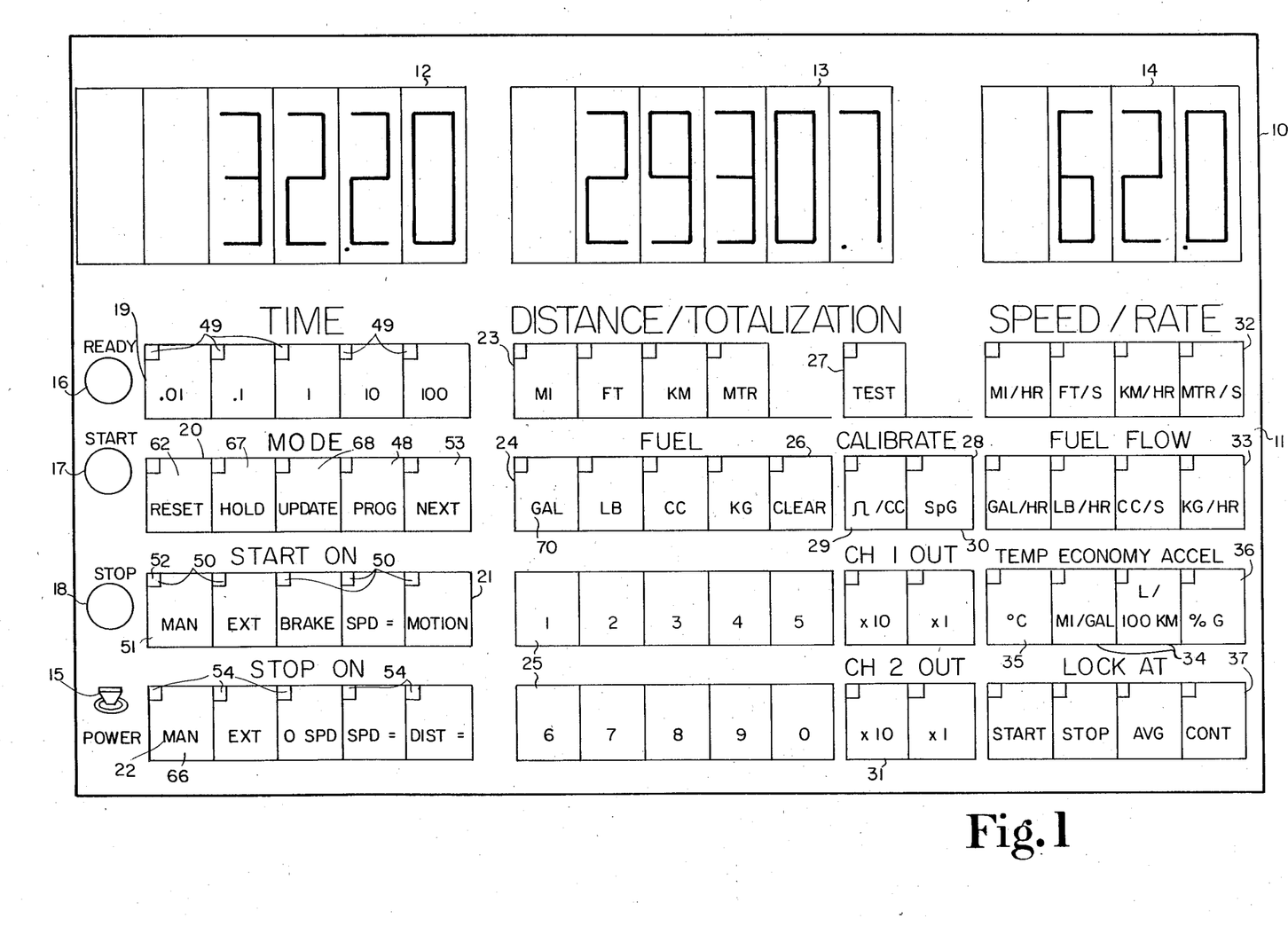
FIG. 1 is a frontal elevational view of the box which houses the computer and the control panel on the front of this box showing the control switches and the digital displays.

FIG. 1 shows the computer housing box 10 and the control panel 11 on the front of the box 10. In the preferred embodiment this housing box 10 is extremely portable in that it is light weight and is only 12 inches wide by 4 inches high by 6 inches deep. The control panel 11 has a six digit digital time display 12 and a six digit digital totalization display 13 and a four digit digital rate display 14. The control panel 11 further includes a power switch 15, computer status lights which are a ready light 16, a start light 17, and a stop light 18. The control panel 11 further includes an array of switches. In the preferred embodiment these switches are of dome switch technology rather than of membrane technology for the purpose of positive action and tactile feel. The control panel 11 has a 4×16 array of switches which are grouped into small arrays of switches with similar functions. These small arrays consist of a 1×5 array of time display switches 19, a 1×5 array of mode switches 20, a 1×5 array of start on switches 21, a 1×5 array of stop on switches 22, a 1×4 array of distance output switches 23, and a 1×4 array of total fuel volume and mass output switches 24. There are eleven switches for calibration setting during the programming state 47 (FIG. 3) and these switches include a 2×5 array of digital number setting switches 25 for inputting the calibrated value by the user and there is a clear switch 26 for clearing the value. There is a test mode switch 27. There are calibration selection switches which include a pulse calibration switch 29 and a fuel specific gravity calibration switch 30. There is a 2×2 array of analog output gain selection switches 31. There is a 1×4 array of speed output switches 32, and a 1×4 array of fuel volume and mass flow rate output switches 33. There are two fuel economy output switches 34. There is a fuel temperature output switch 35 and there is an acceleration output switch 36. Finally there is a 1×4 array of rate display lock at switches 37.

Various small arrays of switches have user-prompting lights adjacent to each switch. An example is the time display switch user-promoting lights 49 which are located adjacent the time diplay switches 19. All of the small switch arrays have user-prompting lights except for the array of digital number setting switches 25.

Figure 2:
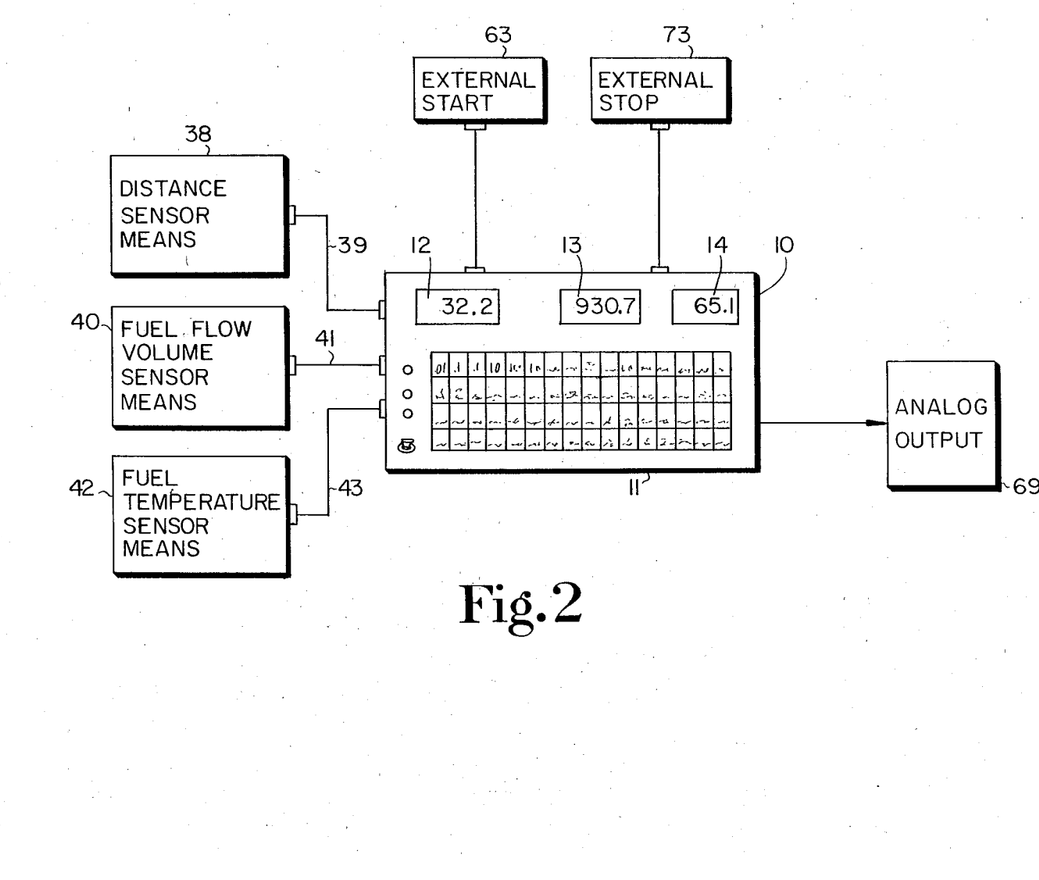
FIG. 2 is a drawing depicting the entire system showing the vehicle performance monitoring sensor means engaged to the computer box.

FIG. 2 is a total system overview diagram. The figure shows the distance sensor means 38 which in the preferred embodiment would be a standard fifth wheel. As is known in the art a typical fifth wheel consists of a wheel and a transmitter assembly with an etched metal optical encoder. The system basically measures distance by the relation between the rotation of the wheel and the pulses of the optical encoder and sends an electronic signal to the computer housing box 10 via cable 39. Further the fifth wheel would be mounted to the motor vehicle as is known in the art. FIG. 2 also shows a representation for the fuel volume flow sensor means 40. This sensor 40 is also connected to the computer box 10 by a cable 41. In the preferred embodiment a positive displacement flow meter is used. The fuel volume flow sensor means 40 provides an electronic signal through the cable 41 so as to provide fuel flow data signals to the computer in the computer housing box 10. Finally the diagram shows the fuel temperature sensor means 42 which are connected also by a cable 43 to the box 10 so as to provide electronic signals from the fuel temperature sensor means 42 to the computer in the computer housing box 10. In the preferred embodiment the fuel temperature sensor means 42 is a semiconductor temperature transducer feeding a twelve bit analog to digital converter to digitize temperature data.

The computer housing box 10 contains computer means which are well known in the art. It is believed that anyone skilled in the art could easily assemble microprocessor computer means for performing the system functions that are performed by the computer means which are in the computer housing box 10 shown in the preferred embodiment. For the purpose of further disclosure, however, in the preferred embodiment the computer box 10 houses five plug in circuit boards connected to a common mother board so that the entire instrument may be disassembled in a matter of minutes for easy access to all computer components. The computer housing box 10 houses a computer which is configured around an Intel 8085A-2 processor running at 6.5536 megahertz in the preferred embodiment. Program storage is in 8K bytes stored in two 2732 EPROMs. One K bytes of RAM are included on two 2114 chips as are two identical buffered ten bit analog to digital converters. Accumulation of distance and total fuel information is handled by a single Intel 8253 counter/timer. Therefore this information is then accumulated outside the processor itself to minimize program execution time. Execution time of the entire program requires about 175 milliseconds allowing all data to be updated five times per second. The entire front panel matrix of 64 switches and 50 individual lamps is scanned by an Intel 8279 programmable keyboard/display interface chip. All digital circuitry operates at 5 volts, an inverter being used to generate ±15 volts for the analog circuitry. A total of 63 intergrated circuits are housed on the five separate circuit boards. Extensive noise suppression is used to eliminate radio frequency interference and supply voltage fluctuations. The input voltage range is from 8 to 16 volts allowing operation through a vehicle cranking cycle. The total supply current requirements are about 3 amps depending on the display segments lighted. The entire computer program was written in assembly language to achieve the most compact code and minimum execution time for the program. The entire memory space, 8,192 bytes of the two 2732 EPROMs is used for program storage, leaving 4,096 bytes available for future expansion and co-processor control and transfer in a possible third EPROM. The circuit board layout uses the Bytwide pinout so that 64K EPROMs may be used when they become economically available. The instrument is constructed so that it is possible to add to or modify the capability of the instrument to include such quantities as horsepower and brake specific fuel consumption by changing the control program and adding the necessary circuitry on a board installed in the spare board slot.

The general system layout requires the mounting of the distance sensor means 38 which is preferably a fifth wheel to the motor vehicle so as to measure distance displacement of the motor vehicle as it moves and for the fuel volume sensor means 40 which is preferably a positive displacement flow meter to be mounted to the motor vehicle's fuel line so as to measure fuel flow and for the fuel temperature sensor means 42 which is preferably a semiconductor temperature transducer to be mounted to the motor vehicle's fuel lines so as to measure the temperature of the motor vehicle fuel being measured by the fuel volume flow sensor means 40. The sensors then send electronic signals which correspond to the vehicle performance characteristic of either distance, fuel flow, or temperature to the computer box 10 via respectively cables 39, 41 and 43. Inside the computer box 10, the computer means perform the various calculations dependent upon the programming and data output selected through the use of the control panel 11 by the user.

Figure 3:
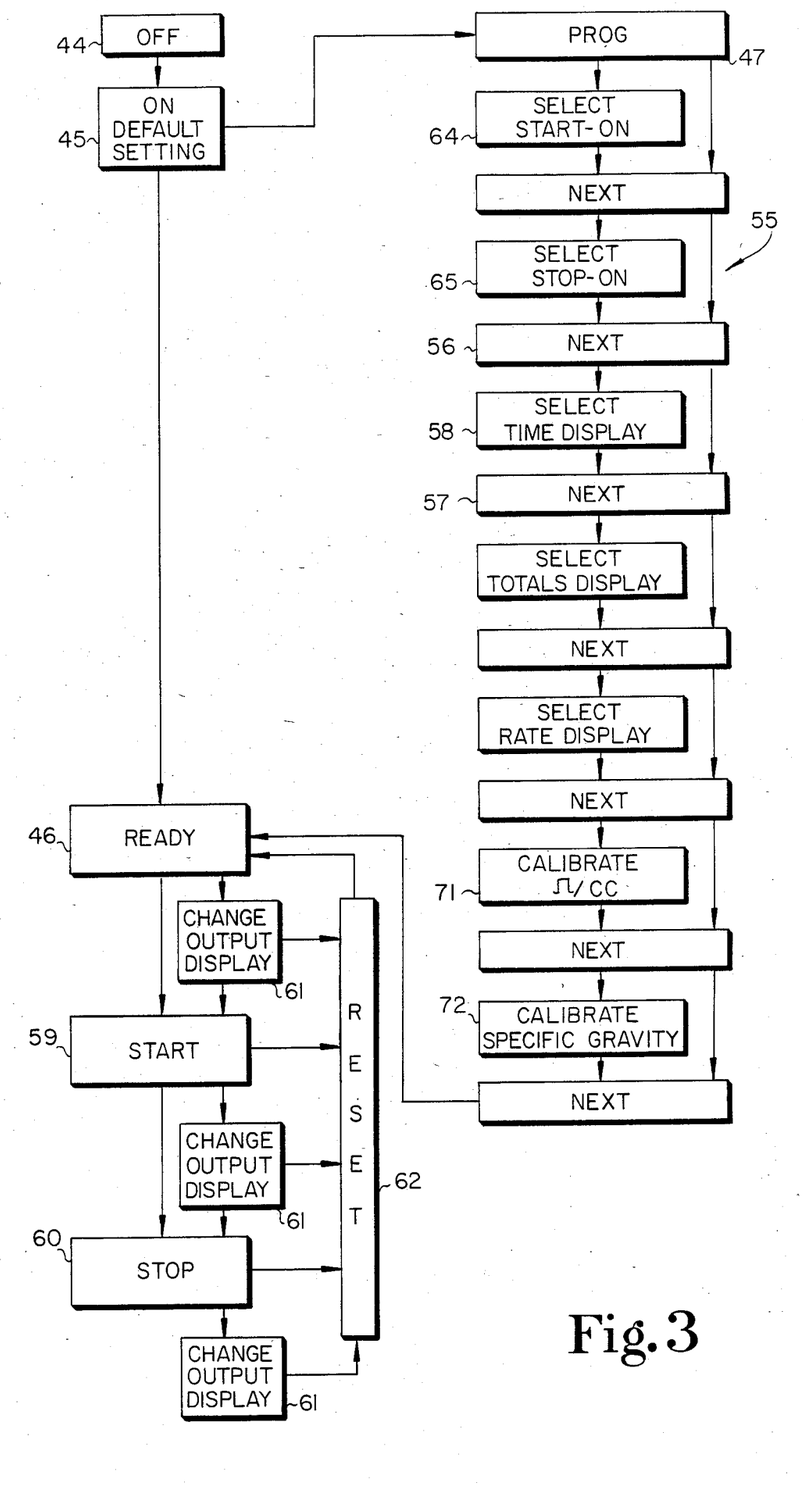
FIG. 3 is a flow chart of the states of the computer with relation to the user.
Figure 4:
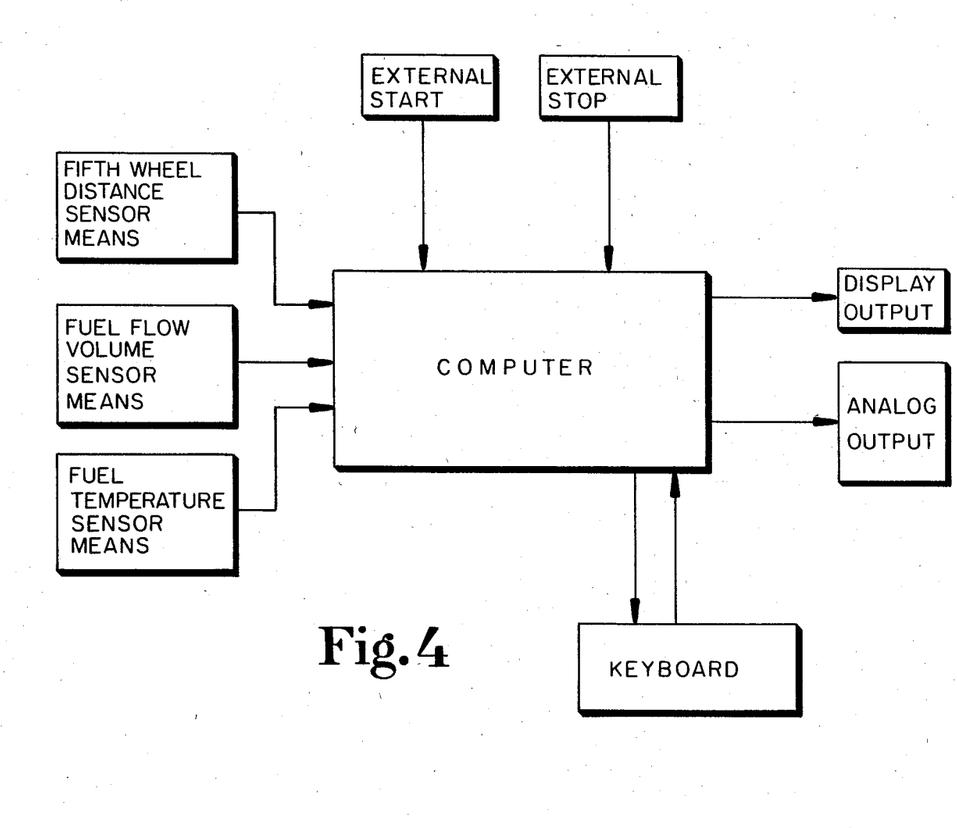
FIG. 4 is a generalized schematic of the preferred embodiment of the present invention.

The preferred embodiment allows for easy use by a user. FIG. 3 is a flow chart of how the user would use this system. The user would first turn the system from the off state 44 to the on default state 45 by turning the system on with the power switch 15. In the on default state 45 the system would set all of its parameters to default values. Then the user could either go to the ready state 46 or he could select different values than the default values by altering the system's programming in the programming state 47. The user would press the PROG programming switch 48 in the array of mode switches 20 on the control panel 11 to put the system in the programming state 47. The start on switches user-prompting lights 50 adjacent to the array of start on switches 21 would begin blinking on and off in the start on selection state 64. These lights blinking on and off would aid the user by indicating what his next available choice is to program the device. This method of user-prompting by the machine would allow an inexperienced user to easily program and set the machine. The lights adjacent to the switches of the next programming mode he must select blink on and off while the lights adjacent to switches not yet eligible for selection remain off. Thus the user would realize that his selection has to come from among this array of switches whose lights are blinking. The user then presses the switch of the function he desires among those switches with blinking lights. The light of the switch he selects then remains on so the user can easily see which selection he has chosen. Because the system has a default setting if the user would to fail to make a selection, the light of the switch which is the default setting would remain on and would not blink so that the user could see which setting he would have if he would not make a selection. The light of all the switches which have been user selected or computer defaulted to remain on. For example, the user would press one of the start-on selections, such as the manual start switch 51, and that switch's light 52 would remain on as the remaining start on switch user-prompting lights 50 would continue blinking. Then the user would press the NEXT switch which is in the array of mode switches 20 and adjacent to the programming switch 48. The start on switch user-prompting lights 50 would go off and the stop on switch user-prompting lights 54 adjacent the array of stop on switches 22 would start blinking because the programming state 47 would now be the stop on selection state 65. Again the user would make a choice and so on and so forth as is easily discerned from the programming sequence flow chart 55, FIG. 3.

It is important to note that the successive presses of the NEXT switch 53 lead the user through the arrays of switches from which the next selection must be made. This is done because each time the NEXT switch 53 is pressed a new array of switches lights up and the prior array of selections is extinguished. In this way the user must make all the necessary selections or accept the default setting for that selection. The user must go through all the choices shown in the programming sequence flow chart 55 before he can get back to the ready state 46. This sequencing insures that the user does not forget to program any parameters. If the user desires to keep a default setting in any state selection he can bypass it by pressing the NEXT switch 53 and the system will use the default parameter for the state selection which was bypassed. For example if the user desires to keep the default time display selection he would first be in next state 56 he would then press the NEXT switch 53 and bypass the time display selection state 58 and go directly to next state 57.

It should also be noted that the user also can control the calibrations during this programming phase for fuel specific gravity and fuel meter pulse rate calibration so that the computer can calculate mass from the volume data. The user calibrates those values with the digital number setting switches 25 and the clear switch 26. This is done when the system is in the programming state 47 and in the respective pulse calibration selection state 71 and the fuel specific gravity calibration state 72.

Once the user has programmed the system as he wants it, he can then run the monitoring test on the vehicle. This is shown by the start state 59 and the stop state 60. The change display state 61 shows how the user can change the units and the characteristic being outputted at any time during the test by using the control panel 11 switches. Then the user can press the reset switch 62 and clear the system of data and return it to the ready state 46.

TABLE 1

| | | |
|---|---|---|
| INPUTS: | | |
| 1. | VEHICLE PERFORMANCE SENSORS | |
| | (a) D = Distance Signal | |
| | (b) V = Fuel Volume Signal | |
| | (c) T = Fuel Temperature Signal | |
| 2. | PRESET CALIBRATIONS | |
| | (a) $S_pG$ = Fuel Specific Gravity | |
| | (b) II/cc = Fuel Volume Signal II/cc | |
| 3. | INTERNAL TIMER | |
| | (a) t = time | |
| OUTPUTS | | |
| 1. | DIGITAL TIME DISPLAY | |
| | (a) Time in Seconds (.01, .1 or 1) | |
| 2. | DIGITAL TOTALIZATION DISPLAY | |
| | (a) f(D) Total Distance in Miles, Feet, Kilometers, Meters | |
| | (b) f(V) Total Fuel Volume in Gallons, Cubic Centimeters | |
| | (c) f(V, SG, T) Total Fuel Mass in Pounds, Kilograms | |
| 3. | DIGITAL RATE DISPLAY | |
| | (a) Starting, Stopping, Average, Continuous Values of: | |
| | (i) f(D, t) Vehicle Speed in Miles/Hour, Feet/Second, Kilometers/Hour, Meters/Second | |
| | (ii) f(V, t) Fuel Volume Flow in Gallons/Hour, Cubic Centimeters/Second | |
| | (iii) f(V, $S_pG$, T) Fuel Mass Flow in Pounds/Hour, Kilograms/Hour | |
| | (iv) Fuel Economy in Miles/Gallon, Liters/100 Kilometers | |
| | (b) f(T) Fuel Temperature in °C. | |
| | (c) f(D, t) Acceleration as a % of Gravity | |
| 4. | ANALOG OUTPUTS OF ALL OF THE ABOVE DIGITAL OUTPUTS- | |

Table 1 above shows the inputs and the outputs of the system of the preferred embodiment. The system takes as input the signals from the sensors which are signals corresponding to the distance that the vehicle travels and the volume of the fuel consumed and the temperature of that fuel and then uses an internal timing device to time the test. The system is also calibrated for fuel specific gravity and fuel volume signal pulse rate during the programming state 47 by the user. From this input, the computer within the computer housing box 10 then calculates the total distance travelled, the total volume of fuel used, the total mass of fuel used, motor vehicle speed, fuel volume rate, fuel mass rate, fuel economy, the temperature in degrees Centigrade, and acceleration of the motor vehicle as a percentage of gravity. The system also calculates the starting values, the stopping values, the average values, and the current values of vehicle speed, fuel volume flow rate, fuel mass flow rate, and fuel economy. It is important to note that the system produces output of these motor vehicle performance characteristics in various units of both English and Metric measurement units.

Of specific notice is the fact that the present motor vehicle performance system has a combined mass and volume flow meter through the use of the fuel volume sensor means 40 and the fuel temperature sensor means 42 and a computer. The computer gets volumetric data and temperature data and calculates this in an internal equation with a preset specific gravity of the fuel used so that it can convert volume data to mass data. The present invention particularly takes advantage of the computer calculation method for conversion of fuel volume measurements to mass measurements by the following equation which has been mathmetically and experimentally determined and placed in the computer. The values are measured with mass M being in grams, volume V being in cc, and calibrated specific gravity CSG being in g/cc of the fuel at a temperature T of 15.5556° C. (60° F.). Diesel fuel typically has a calibrated specific gravity of 0.825 g/cc at 15.5556° C. Different fuels have different values for specific gravity SPG at 15.5556° C.

Mass=(Volume) (Calibrated Specific Gravity) [1+(15.5556° C.-Temperature in °C.) (0.000862/°C.+(0.00234 cc/g°C.) (0.825 g/cc-Calibrated Specific Gravity)+0.00648 cc²/g²°C.) (0.825 g/cc-Calibrated Specific Gravigy)²)].

$$M = V \times CSG \times [1 + \Delta T(0.000862 + 0.00234 \times \Delta SPG + 0.00648 \times \Delta SPG^2)]$$

The basic equation converts volume to mass through an algorithm which calculates mass as a function of (1) volume, (2) specific gravity, (3) temperature (4) a first order change in specific gravity, and (5) a second order change in specific gravity.

Overall, the system operates by starting, timing and accumulation of fuel and distance, all from zero and at the same time, and later stopping the accumulation of time, fuel and distance, leaving the totals displayed. Rate quantities such as miles per hour, gallons per hour, and miles per gallon are available in the rate displays as a snap shot of the quantities before, during, and after the timed event or test. The total measurement capabilities of the system, for the sake of clarity is broken into six categories: the starting mode; the stopping mode; timing; totalization; rate; and miscellaneous functions. These will be described in more detail. The system features the use of an array of possible stop and start states. Many of these stop and controlled by the computer so that the system could run an entire test with no user control during the test.

There are five starting modes in the preferred embodiment. These are basically an external starting mode and a calculated starting mode. The external mode requires the use of either the manual starting switch 51 on the control panel or an external contact closure logic level or a contact on the brake pedal which would be an external start signal 63. These are selected from their respective switches on the array of start on switches 21. The internally calculated starting modes are the spped equals and motion modes where the system begins calculation once the speed of the vehicle is either greater than zero for motion or equal to a preset speed equals. This preset speed equals can be set during the programming state 47 during the start on selection state 64 by use of the digital number setting switches 25 which would set a starting speed that would be shown on the digital rate display 14 so that the user could verify he has set the starting speed he desires. Next the system has a stop mode which again has five basic modes which are broken into the two modes of either external or internally calculated modes. The external modes once again are manual stopping switch 66 in the array of stop on switches 22 or an external contact closure logic level which would be an external stop signal 73. The internally connected calculated stop modes are based on whether the vehicle has attained a speed equal to zero or a speed preset by the user or if the vehicle has traveled a preset distance set by the user during the programming state 47. The speed equals is set in the same manner as it is set for the start mode, but the distance equals is set by pressing the digital number setting switches 25 to obtain the proper stopping distance value which would be shown on the digital totals display 13. Any of the start modes may be used in combination with any of the stop modes allowing for a wide variety of computer controlled start/stop conditions to be used.

The time display switches 19 allow for the digital time display 12 to be in 0.01 second, 0.1 seconds, or 1 second resolutions and also the time display switches 19 allow for modifying the update time of the digital rate display 14 from its normal rate of 5 updates per second to either 1 update per second or 1 update per 10 seconds or 1 update per 100 seconds by pressing respectively either the 1, 10, or 100 switches in the array of time display switches 19. These longer update times are useful for smoothing rapidly changing data when the instantaneous values may not be of interest, but longer time averages may be more meaningful. An example would be fuel flow or miles per gallon under stop and go conditions over a long period of time.

The totalization category of functions of the system uses the distance output control switches 23 and the total fuel volume and mass output switches 24. With these array of switches the digital totalization display 13 can be altered so that the system will either show the total distance traveled by the vehicle or show the total volume of fuel consumed by the vehicle, or else the total mass of fuel consumed by the vehicle.

The rate quantities category of calculations of the vehicle is displayed on th digital rate display 14. Here, depending on which switches are selected, the vehicle will show the speed of the vehicle or the fuel volume flow rate, or the fuel mass flow rate, or the economy quantity of the vehicle in miles per gallon or liters per 100 kilometers. These values of speed, fuel flow, and economy can be seen at a starting value when the system first started the calculations, the stopping value when the system stopped its calculations, an average value or a continuous value showing the value at the present time depending on a choice by the user using the array of rate display lock-at switches 37. Further, the digital rate display 14 is capable of also showing temperature in degress Centigrade using the fuel temperature output switch 35 or acceleration as a percentage of gravity using the acceleration output switch 36.

The system has several special features which are a test mode switch 27 which allows the system to test itself without having the vehicle performance monitor sensors attached because the system generates an internal signal equivalent to 60 miles per hour and a mid range fuel flow signal for the purposes of testing. The system also has a display hold switch 67 and a display update switch 68. When the display hold switch 67 is pressed the three digital time 12, totalization 13 and rate 14 displays are locked to allow for example the user to copy the displayed values down on paper and while the system internally continues to update these values.

Then once the display update switch 68 is pressed, the three displays are updated to the current value. Finally the system has an interpolation feature where the values calculated at the starting time and the stopping time are made more accurate by interpolating between the values just before and after starting and the values just before and after stopping. Finally, the system has the analog outputs 69 which can be used to drive a chart recorder or the like.

Another significant feature of the system is the change display feature 61 which allows the user to alter the displays of distance and time and speed rate at any time during the test so as to read off different values. For example if the digital totalization display 13 showing distance in feet, the user could easily press for example the GAL switch 70 in the array of total fuel volume and mass switches 24 and the digital totalization display 13 would now show the volume of fuel in gallons while the internal calculation of all these values would not be affected by the selection of different displayed output values While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A motor vehicle performance monitoring system which measures motor vehicle performance characteristics, said system comprising:
   motor vehicle performance sensor means operable (1) to sense motor vehicle performance characteristics and further operable (2) to produce data signals corresponding to the motor vehicle performance characteristic sensed;
   computer means arranged to operate based upon a set of computer parameters, said computer means being electrically connected with said sensor means and operable to receive as input said data signals and to calculate motor vehicle performance characteristic calculations from said data signals;
   said computer parameters include a (1) calculation starting parameter that is used by said computer means to determine that the computer means should begin to calculate motor vehicle performance characteristic calculations from said data signals and a (2) calculation stopping parameter that is used by said computer means to determine that the computer means should stop calculating motor vehicle performance characteristic calculations from said data signals;
   data output means electrically connected with said computer means, said data output means being operable to produce output data corresponding to various motor vehicle performance characteristics and types of measurements of said characteristics;
   programming control means electrically connected with said computer means and said programming control means being operable (1) to select computer parameters to be set and to set the computer parameter selected to a particular value and operable (2) to select the particular output data corresponding to a motor vehicle performance characteristic to be set and to set the output data selected to a particular type of measurement of said characteristic; and said computer means include default parameter means operable to set said computer parameters to a default setting.

2. The system of claim 1 wherein the value of said calculation starting parameter is based on an (1) external starting parameter and a (2) calculated starting parameter; and the value of said calculation stopping parameter is based on an (1) external stopping parameter and a (2) calculated stopping parameter.

3. The system of claim 2 wherein said computer parameters include calculation calibration parameters.

4. The system of claim 3 wherein the value of said external starting parameter is based on a (1) manual switch parameter, (2) an external start parameter, and a (3) brake start parameter;

the value of said calculated starting parameter is based on a (1) starting speed equals computer parameter, and a (2) vehicle motion computer parameter;

the value of said external stopping parameter is based on a (1) manual switch parameter and an (2) external stop parameter; and the value of said calculated stopping parameter is based on a (1) stopping zero speed computer parameter a (2) a stopping speed equals computer parameter, and a (3) stopping distance equals computer parameter.

5. The system of claim 1 wherein said computer parameters include calculation calibration parameters.

6. The system of claim 1 wherein said programming control means includes a keyboard operable (1) to select computer parameters desired to be set by a user and to set the computer parameter selected to a value by a user and (2) to select the particular output data corresponding to a motor vehicle performance characteristic to be set by a user and to set the output data selected to a particular type of measurement of said characteristic by a user.

7. The system of claim 6 wherein said keyboard includes electrically energizable prompting means operable to aid the user to readily operate the keyboard.

8. The system of claim 7 wherein said electrically energizable prompting means include programming sequence prompting means for guiding the user through the programming.

9. The system of claim 8 wherein said electrically energizable prompting means include an array of switches and each switch in said array has a light adjacent to each switch;

each light has a first illumination state and a second illumination state.

10. The system of claim 9 wherein said first illumination state corresponds to the selected switch and said second illumination state corresponds to the remaining selectable switches.

11. The system of claim 10 wherein said first illumination state is steady state and said second illumination state is flashing.

12. The system of claim 7 wherein said electrically energizable prompting means include an array of switches and each switch in said array has a light adjacent to each switch;

each light has a first illumination state and a second illumination state.

13. The system of claim 12 wherein said first illumination state corresponds to the selected switch and said second illumination state corresponds to the remaining selectable switches.

14. The system of claim 13 wherein said first illumination state is steady state and said second illumination state is flashing.

15. The system of claim 6 wherein the value of said calculation starting parameter is based on an (1) external starting parameter and a (2) calculated starting parameter; and the value of said calculation stopping parameter is based on an (1) external stopping parameter and a (2) calculated stopping parameter.

16. The system of claim 15 wherein said keyboard includes electrically energizable prompting means operable to aid the user to readily operate the keyboard.

17. The system of claim 16 wherein said electrically energizable prompting means include programming sequence prompting means for guiding the user through the programming.

18. The system of claim 17 wherein said electrically energizable prompting means include an array of switches and each switch in said array has a light adjacent to each switch;

each light has a first illumination state and a second illumination state.

19. The system of claim 18 wherein said first illumination state corresponds to the selected switch and said second illumination state corresponds to the remaining selectable switches.

20. The system of claim 19 wherein said first illumination state is steady state and said second illumination state is flashing.

21. The system of claim 1 wherein said motor vehicle performance sensor means include motor vehicle displacement sensor means operable to (1) sense distance that the vehicle travels and operable to (2) produce distance signals corresponding to the motor vehicle displacement.

22. The system of claim 21 wherein said vehicle displacement sensor means include a fifth wheel device.

23. The system of claim 21 wherein said motor vehicle performance sensor means include motor vehicle fuel flow sensor means operable (1) to sense fuel flow and operable to (2) produce fuel flow signals corresponding to the fuel flow.

24. The system of claim 23 wherein said motor vehicle fuel flow sensor means include (1) a fuel volume flow meter and (2) further includes temperature sensor means and said temperature means being operable to (a) sense fuel temperature and operable to (b) produce temperature signals corresponding to the fuel temperature; and said computer means include a fuel flow signal calibration parameter and a fuel specific gravity calibration parameter.

25. The system of claim 24 wherein said programming control means includes a keyboard operable (1) to select computer parameters desired to be set by a user and to set the computer parameter selected to a value by a user and (2) to select the particular output data corresponding to a motor vehicle performance characteristic to be set by a user and to set the output data selected to a particular type of measurement of said characteristic by a user.

26. The system of claim 25 wherein said keyboard includes electrically energizable prompting means operable to aid the user to readily opeate the keyboard.

27. The system of claim 26 wherein said electrically energizable prompting means include programming sequence prompting means for guiding the user through the programming.

28. The system of claim 27 wherein said electrically energizable prompting means include an array of switches and each switch in said array has a light adjacent to each switch;

each light has a first illumination state and a second illumination state.

29. The system of claim 28 wherein said first illumination state corresponds to the selected switch and said second illumination state corresponds to the remaining selectable switches.

30. The system of claim 29 wherein said first illumination state is steady state and said second illumination state is flashing.

31. The system of claim 26 wherein said electrically energizable prompting means include an array of switches and each switch in said array has a light adjacent to each switch;

each light has a first illumination state and a second illumination state.

32. The system of claim 31 wherein said first illumination state corresponds to the selected switch and said second illumination state corresponds to the remaining selectable switches.

33. The system of claim 32 wherein said first illumination state is steady state and said second illumination state is flashing.

34. The system of claim 25 wherein the value of said calculation starting parameter is based on an (1) external starting parameter and a (2) calculated starting parameter; and the value of said calculation stopping parameter is based on an (1) external stopping parameter and a (2) calculated stopping parameter.

35. The system of claim 34 wherein said keyboard includes electrically energizable prompting means operable to aid the user to readily operate the keyboard.

36. The system of claim 35 wherein said electrically energizable prompting means include programming sequence prompting means for guiding the user through the programming.

37. The system of claim 36 wherein said electrically energizable prompting means include an array of switches and each switch in said array has a light adjacent to each switch;

each light has a first illuminating state and a second illumination state.

38. The system of claim 37 wherein said first illumination state corresponds to the selected switch and said second illumination state corresponds to the remaining selectable switches.

39. The system of claim 38 wherein said first illumination state is steady state and said second illumination state is flashing.

40. The system of claim 23 wherein said motor vehicle fuel flow sensor means include a fuel volume flow meter.

41. The system of claim 22 wherein said motor vehicle performance sensor means include motor vehicle fuel flow sensor means operable (1) to sense fuel flow and operable to (2) produce fuel flow signals corresponding to the fuel flow.

42. The system of claim 41 wherein said motor vehicle fuel flow sensor means include (1) a fuel volume flow meter and (2) further includes temperature sensor means and said temperature means being operable to (a) sense fuel temperature and operable to (b) produce temperature signals corresponding to the fuel temperature; and said computer means include a fuel flow signal calibration parameter and a fuel specific gravity calibration parameter.

43. The system of claim 41 wherein said motor vehicle fuel flow sensor means includes a fuel volume flow meter.

44. The system of claim 1 wherein said motor vehicle performance sensor means include motor vehicle fuel flow sensor means operable (1) to sense fuel flow and operable to (2) produce fuel flow signals corresponding to the fuel flow.

45. The system of claim 44 wherein said motor vehicle fuel flow sensor means include (1) a fuel volume flow meter and (2) further includes temperature sensor means and said temperature means being operable to (a) sense fuel temperature and operable to (b) produce temperature signals corresponding to the fuel temperature; and said computer means include a fuel flow signal calibration parameter and a fuel specific gravity calibration parameter.

46. The system of claim 44 wherein said motor vehicle fuel flow sensor means include a fuel volume flow meter.

47. A motor vehicle performance monitoring system which measures motor vehicle performance characteristics, said system comprising:

motor vehicle performance sensor means operable (1) to sense motor vehicle performance characteristics and further operable (2) to produce data signals corresponding to the motor vehicle performance characteristic sensed;

computer means arranged to operate based upon a set of computer parameters, said computer means being electrically connected with said sensor means and operable to receive as input said data signals and to calculate motor vehicle performance characteristic calculations from said data signals;

said computer parameters include a (1) calculation starting parameter that is used by said computer means to determine that the computer means should begin to calculate motor vehicle performance characteristic calculations from said data signals and a (2) calculation stopping parameter that is used by said computer means to determine that the computer means should stop calculating motor vehicle performance characteristic calculations from said data signals;

data output means electrically connected with said computer means, said data output means being operable to produce output data corresponding to various motor vehicle performance characteristics and types of measurements of said characteristics; and programming control means electrically connected with said computer means and said programming control means being operable (1) to select computer parameters to be set and to set the computer parameter selected to a particular value and operable (2) to select the particular output data corresponding to a motor vehicle performance characteristic to be set and to set the output data selected to a particular type of measurement of said characteristic;

said proramming control means includes a keyboard operable (1) to select computer parameters desired to be set by a user and to set the computer parameter selected to a value by a user and (2) to select the particular output data corresponding to a motor vehicle performance characteristic to be set by a user and to set the output data selected to a particular type of measurement of said characteristic by a user; and said keyboard includes electrically energizable prompting means operable to aid the user to readily operate the keyboard; and said computer means include default parameter means operable to set said computer parameters to a default setting.

48. The system of claim 47 wherein said electrically energizable prompting means include programming sequence prompting means for guiding the user through the programming.

49. The system of claim 48 wherein said electrically energizable prompting means include an array of switches and each switch in said array has a light adjacent to each switch;

each light has a first illumination state and a second illumination state.

50. The system of claim 49 wherein said first illumination state corresponds to the selected switch and the second illumination state corresponds to the remaining selectable switches.

51. The system of claim 50 wherein said first illumination state is steady state and said second illumination state is flashing.

52. The system of claim 47 wherein said electrically energizable prompting means include an array of switches and each switch in said array has a light adjacent to each switch;

each light has a first illumination state and a second illumination state.

53. The system of claim 52 wherein said first illumination state corresponds to the selected switch and said second illumination state corresponds to the remaining selectable switches.

54. The system of claim 53 wherein said first illumination state is steady state and said second illumination state is flashing.

* * * * *

UNITED STATES PATENT AND TRADEMARK OFFICE
CERTIFICATE OF CORRECTION

PATENT NO.  : 4,593,357
DATED       : June 3, 1986
INVENTOR(S) : William F. VanOstrand and Jeffrey M. Sylvia It is certified that error appears in the above-identified patent and that said Letters Patent is hereby corrected as shown below:

In column 13, line 3, delete the word "opeate" and insert
    --operate--.

In column 13, line 52, delete the word "illuminating" and
    insert --illumination--.

In column 15, line 4, delete the word "proramming" and
    insert --programming--.

Signed and Sealed this

Twentieth Day of October, 1987

Attest:

DONALD J. QUIGG

Attesting Officer

Commissioner of Patents and Trademarks